United States Patent
Langbein et al.

(10) Patent No.: US 12,440,307 B2
(45) Date of Patent: Oct. 14, 2025

(54) APEX LOCATOR ATTACHMENT

(71) Applicant: DENTSPLY SIRONA Inc., York, PA (US)

(72) Inventors: Silvio Langbein, Finsing (DE); Reinhold Storch, Freiburg (DE)

(73) Assignee: Dentsply Sirona Inc., York, PA (US)

( * ) Notice: Subject to any disclaimer, the term of this patent is extended or adjusted under 35 U.S.C. 154(b) by 94 days.

(21) Appl. No.: 18/141,047

(22) Filed: Apr. 28, 2023

(65) Prior Publication Data

US 2023/0338115 A1 Oct. 26, 2023

Related U.S. Application Data

(63) Continuation of application No. 15/966,097, filed on Apr. 30, 2018, now abandoned.

(60) Provisional application No. 62/491,506, filed on Apr. 28, 2017.

(51) Int. Cl.
- *A61C 5/44* (2017.01)
- *A61C 5/42* (2017.01)
- *A61C 19/04* (2006.01)

(52) U.S. Cl.
CPC ............... *A61C 5/42* (2017.02); *A61C 5/44* (2017.02); *A61C 19/042* (2013.01)

(58) Field of Classification Search
CPC .... A61C 5/42; A61C 5/44; A61C 5/40; A61C 19/042; A61C 19/041; A61C 19/04; A61B 2017/305; A61B 18/1442; A61B 18/146

See application file for complete search history.

(56) References Cited

U.S. PATENT DOCUMENTS

| | | | |
|---|---|---|---|
| 2,381,084 A | | 8/1945 | Slad |
| 4,005,714 A | * | 2/1977 | Hiltebrandt ........ A61B 18/1442 606/51 |
| 4,035,919 A | | 7/1977 | Cusato |
| 4,552,143 A | | 11/1985 | Lottick |
| 6,322,583 B1 | * | 11/2001 | Tu ........................... A61H 13/00 15/22.1 |
| 6,679,881 B1 | * | 1/2004 | Bybee ................ A61B 18/1442 606/51 |
| 2003/0064347 A1 | | 4/2003 | Ahani |

(Continued)

FOREIGN PATENT DOCUMENTS

| CA | 3060310 A1 | 11/2018 |
|---|---|---|
| CN | 101828976 A | 9/2010 |

(Continued)

OTHER PUBLICATIONS

"U.S. Appl. No. 15/966,097, Final Office Action mailed Feb. 9, 2023", 8 pgs.

(Continued)

*Primary Examiner* — Yogesh P Patel
(74) *Attorney, Agent, or Firm* — SCHWEGMAN LUNDBERG & WOESSNER, P.A.

(57) ABSTRACT

An apex locator attachment for connection to an apex locator for measurement of the position of the length of a root canal during endodontic treatment. A shape, structure and dimensions of the attachment are configured to maximize the ease of use of the attachment and to enable mechanical and electrical coupling of a dental instrument to an apex locator while allowing the apex locator attachment to be easily cleaned, disinfected and autoclaved.

6 Claims, 7 Drawing Sheets

(56) References Cited

U.S. PATENT DOCUMENTS

| | | |
|---|---|---|
| 2009/0054925 A1 | 2/2009 | Cho |
| 2009/0148810 A1 | 6/2009 | Maxwell et al. |
| 2013/0150729 A1 | 6/2013 | Zuluage |
| 2017/0156785 A1* | 6/2017 | Smith ................ A61B 18/1206 |
| 2018/0228575 A1 | 8/2018 | Scommegna et al. |
| 2019/0117335 A1 | 4/2019 | Langbein et al. |
| 2019/0125508 A1* | 5/2019 | Bagheri .................. A61C 5/42 |

FOREIGN PATENT DOCUMENTS

| | | |
|---|---|---|
| EP | 1747767 A1 | 1/2007 |
| JP | S5029512 | 4/1975 |
| JP | H0388890 A | 4/1991 |
| JP | H0529512 U | 4/1993 |
| JP | H0956734 A | 3/1997 |
| JP | 2001309932 A | 11/2001 |
| JP | 2004000554 A | 1/2004 |
| JP | 2007209764 A | 8/2007 |
| JP | 2011030637 A | 2/2011 |
| JP | 2013081568 A | 5/2013 |
| WO | WO-2013040074 A1 | 3/2013 |
| WO | WO-2018201127 A1 | 11/2018 |

OTHER PUBLICATIONS

"U.S. Appl. No. 15/966,097, Final Office Action mailed Dec. 14, 2021", 8 pgs.

"U.S. Appl. No. 15/966,097, Non Final Office Action mailed Apr. 27, 2021", 9 pgs.

"U.S. Appl. No. 15/966,097, Non Final Office Action mailed Jul. 8, 2022", 8 pgs.

"U.S. Appl. No. 15/966,097, Response filed Apr. 27, 2022 to Final Office Action mailed Dec. 14, 2021", 9 pgs.

"U.S. Appl. No. 15/966,097, Response filed Aug. 5, 2020 to Restriction Requirement mailed Jun. 15, 2020", 5 pgs.

"U.S. Appl. No. 15/966,097, Response filed Sep. 17, 2021 to Non Final Office Action mailed Apr. 27, 2021", 9 pgs.

"U.S. Appl. No. 15/966,097, Response filed Oct. 28, 2022 to Non Final Office Action mailed Jul. 8, 2022", 9 pgs.

"U.S. Appl. No. 15/966,097, Restriction Requirement mailed Jun. 15, 2020", 6 pgs.

"International Application Serial No. PCT/US2018/030133, International Preliminary Report on Patentability mailed Nov. 7, 2019", 8 pgs.

"International Application Serial No. PCT/US2018/030133, International Search Report mailed Jul. 2, 2018", 4 pgs.

"International Application Serial No. PCT/US2018/030133, Written Opinion mailed Jul. 2, 2018", 6 pgs.

"Canadian Application Serial No. 3,060,310, Office Action mailed Apr. 25, 2024", 3 pgs.

"Canadian Application Serial No. 3,060,310, Response filed Aug. 19, 2024 to Office Action mailed Apr. 25, 2024", 10 pgs.

"Japanese Application Serial No. 2023-188595, Notification of Reasons for Refusal mailed Nov. 5, 2024", w/ English translation, 8 pgs.

"Japanese Application Serial No. 2023-188595, Response filed Feb. 4, 2025 to Notification of Reasons for Refusal mailed Nov. 5, 2024", w/ current English claims, 6 pgs.

* cited by examiner

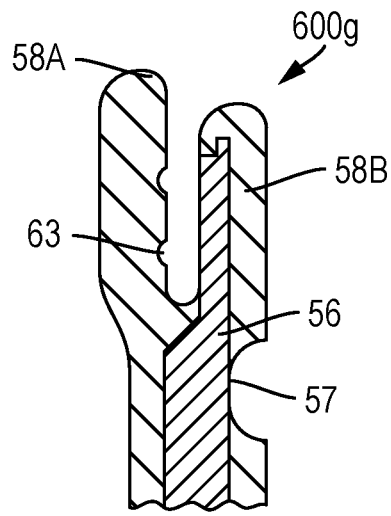
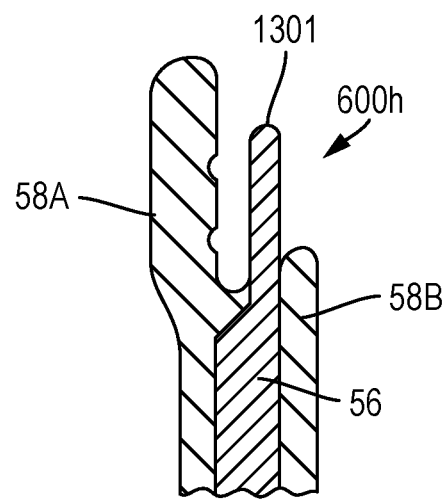
Fig. 7                Fig. 8
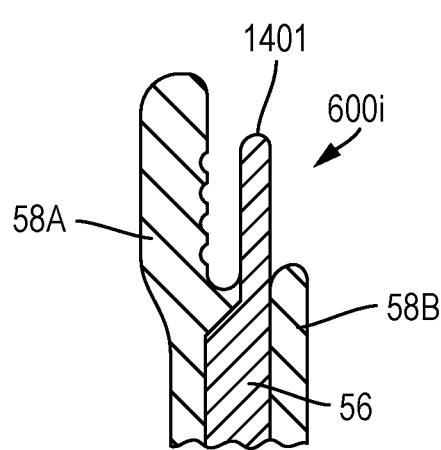
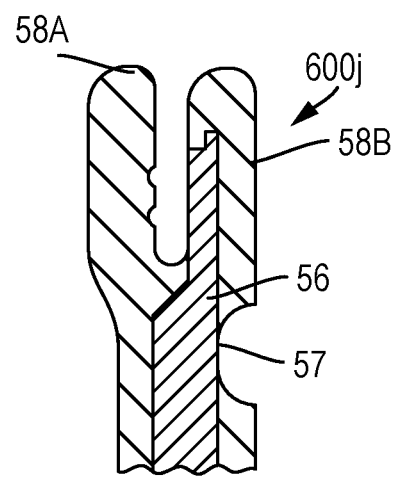
Fig. 9                Fig. 10

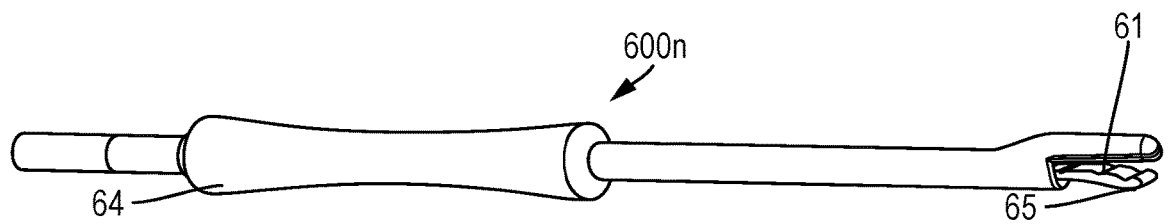
Fig. 14A
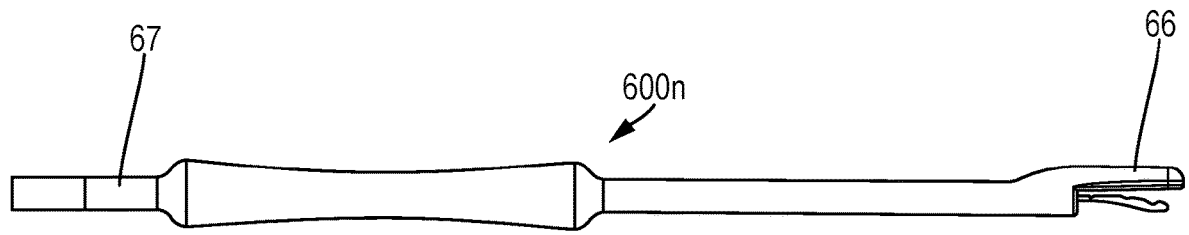
Fig. 14B
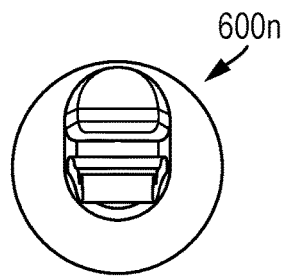          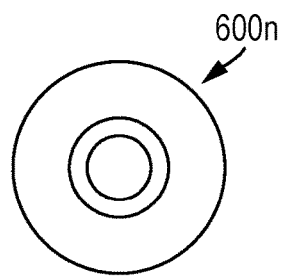
Fig. 14C          Fig. 14D

APEX LOCATOR ATTACHMENT

CROSS-REFERENCE TO RELATED APPLICATIONS

This is a continuation application of U.S. application Ser. No. 15/966,097 filed on Apr. 30, 2018, which claims the benefit of U.S. Provisional Application Ser. No. 62/491,506, filed on Apr. 28, 2017, which are herein incorporated by reference for all purposes.

TECHNICAL FIELD

The present application relates generally to an apex locator attachment for endodontic treatment, and, more particularly, to an apex locator attachment comprising an electrode for connection to an apex locator for measurement of the position of an apical foramen to determine the length of a root canal, wherein the attachment is constructed to be held with one hand and to be disinfected easily. A shape, structure and dimensions of the attachment are configured to maximize the ease of use of the attachment and to enable mechanical and electrical coupling of a dental instrument to an apex locator.

BACKGROUND OF THE INVENTION

Endodontic treatment is important when pulp, which is the soft tissue inside a root canal, becomes inflamed or infected. The inflammation or infection can be caused by deep decay, repeated dental procedures on the tooth or a crack or chip in the tooth. If pulp inflammation or infection is left untreated, it can cause pain or lead to an abscess. Root canal files are used to remove pulp from root canals and files may vary in tip diameter and taper increase.

During endodontic treatment, a dentist may use an apex locator to determine the length of root canal. This may be needed for patients who need to undergo root canal treatment, which requires precise determination of position of the dental file in the canal relative to the root apex. The apex of the root may have a specific resistance to electrical current, and this may be measured using a pair of electrodes hooked into the lip, such as a lip clip, and attached to an endodontic file, such as a file clip. Some attachments include Minigrabber, Root ZX mini, Joypex File clip, touching probes and Mini file holder of MedicNRG.

Minigrabber is a file clip attachment for Apex Locators that is sold by VDW GmbH including a push button by which the hand instrument may be clamped. The file clip has a length of 65 mm and comprises a metal hook which extends from a tip when the push button is pressed. The file clip may be connected to an apex locator with a cable. Root ZX mini and the file clip of Joypex 5 are other file clips with a push button having a window to allow for the apex measurement can be performed without clamping.

Touching probes are other attachments used with apex locators. They may be used to connect an endodontic file to the apex locator by touching the endodontic file of the metal probe with a metal tip of the touching probe. Mini file holder as manufactured by MedicNRG Ltd. comprises a bent metal sheet which is also used for touching the endodontic file during the measurement.

US Patent Application Publication No. 20030064347 discloses a clip that attaches to an endodontic file just under a file handle of the endodontic file to allow for measurement of the length of a root canal.

US Patent Application Publication No. 20090148810 discloses a root canal apex locator having a probe for insertion into a root canal and a lip clip for grounding a patient.

EP1747767 provides a coupling device for electrically coupling a dental instrument to an electrical connector, including a tubular clasp made of an electrically conductive material having a first portion attachable to the connector and a second portion attachable to the dental instrument, the second portion having a slot facilitating insertion and holding of the dental instrument while performing a dental procedure A problem, however, with these conventional designs is that they have moveable parts which can be opened or closed to fix an endodontic instrument by using a push button on their back side. Due to this construction there is at least one opening of the housing in front part of the device and also an excavation inside the housing which cannot be cleaned and disinfected thus reducing efficiency of endodontic treatment.

SUMMARY OF THE INVENTION

Existing limitations associated with the foregoing, as well as other limitations, may be overcome by an apex locator attachment/file clip comprising a metal element for releasably engaging an endodontic file or hand instrument and a cable for connection to an apex locator for measurement of the position of an apical foramen and thus the length of a root canal. A shape and structure of the apex locator attachment (hereinafter also referred to as attachment, file clip, touching probe, probe or the like) as well as dimensions of the attachment may be configured to maximize efficiency and ease of use of the attachment for endodontic procedures with other endodontic instruments (hereinafter also referred to as endodontic file, file, hand instrument, dental instrument, or the like). The attachment may be constructed such that it has no cavities or crevices rendering all components to be easily cleaned, disinfected and autoclaved. The attachment may also include a clamping or hooking mechanism based on a spring back of a hook which may be metal or plastic and may also have no moveable parts.

In one aspect, the present invention provides an apex locator attachment for measuring a depth of the apical foramen, the apex locator attachment comprising: an electrode made of an electrically conductive material having a first portion and a second portion; and an insulating overmold; wherein the first portion includes a clamping element with a spring back mechanism for clamping or hooking said apex locator attachment to the dental instrument for root canal measurement and wherein said second portion is constructed as a jack-style connector or constructed to receive a jack-style connector for connection to an electrical connector of the apex locator.

In yet another aspect, the present invention may include one or more of the following features and any combinations thereof: (i) an apex locator attachment wherein the insulating overmold is made of Polyetherimide products such as Ultem, (ii) an apex locator attachment comprising a window in the insulating overmold wherein the window exposes a portion of the electrode for electrically coupling the dental instrument to an apex locator at a location of the exposed electrode, (iii) an apex locator attachment wherein a whole or part of the apex locator attachment is constructed to be bendable, (iv) an apex locator attachment wherein the electrode comprises a memory alloy to allow the attachment to automatically straighten to a predetermined shape after heating such as during reprocessing, (v) an apex locator attachment wherein the electrode comprises NiTi material, (vi) an apex locator attachment, wherein a shape of an outer profile of the apex locator attachment is constructed to be generally tweezer-like, (vii) an apex locator attachment comprising gripper jaws at the first portion for clamping the dental instrument, (vii) an apex locator attachment comprising a plurality of openings for clamping different shaft diameters of dental instruments.

In yet another aspect, the present invention provides an apex locator attachment for measuring a depth of the apical foramen, the apex locator attachment comprising an electrode made of an electrically conductive material having a first portion and a second portion; an insulating overmold; and a spring made of an electrically conductive material, wherein the spring is coupled to the electrode at the first portion for grasping the dental instrument and wherein said second portion is constructed as a jack-style connector or constructed to receive a jack-style connector for connection to an electrical connector of the apex locator.

In a further aspect, the present invention provides an apex locator attachment for measuring a depth of the apical foramen, the apex locator comprising: a metal element made of an electrically conductive material having a first portion, a second portion and a generally tweezer-like shape; gripper jaws at a first portion of the metal element; and a removable coating component housing a part of the metal element, wherein the removable coating component is constructed to be slid in order to open or close the gripper jaws for clamping or hooking said apex locator attachment to the dental instrument for root canal measurement and wherein said second portion of the metal element is constructed to receive a jack-style connector for connection to an electrical connector of the apex locator.

According to an exemplary embodiment herein, an attachment is provided wherein an outer profile of the attachment may be constructed to have a tweezer-like shape and may comprise gripper jaws for clamping a hand instrument.

According to another exemplary embodiment, a file clip may be constructed to have a tweezer-like shape and may comprise two plastic flanks, with one flank containing an electrode and an end of the file clip constructed as a jack style connector which may be plugged into a female plug of a measurement cable. In another embodiment, an end of the file clip may have a cable for connection to another connector.

In yet another embodiment, the file clip may be constructed with a plurality of openings (for example, two opening) for clamping different shaft diameters of endodontic files.

In another exemplary embodiment herein, a file clip may comprise a spring and an electrode with a plastic overmold wherein an endodontic file may be clamped by the spring for root canal measurement.

Other objects and advantages of the various embodiments of the present invention will become obvious to the reader and it is intended that these objects and advantages are within the scope of the present disclosure. To the accomplishment of the above and related embodiments, this invention may be embodied in the form illustrated in the accompanying drawings, attention being called to the fact, however, that the drawings are illustrative only, and that changes may be made in the specific construction illustrated and described within the scope of this application. Further, the attachment may have at least a part (neck or middle part), which can be bent to reach molars. Moreover, it may include a bendable part, which may be a metal. The bendable part may also be a memory alloy to allow the attachment to automatically straighten to a predetermined shape after heating such as during reprocessing.

Further features and advantages, as well as the structure and operation of various embodiments herein, are described in detail below with reference to the accompanying drawings.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein and wherein:

FIG. 7 shows a cross sectional view of another embodiment according to the present invention comprising a window for using the file clip as a touching probe.

FIG. 8 illustrates a cross sectional view of an embodiment according to the present invention comprising a conductive material for as a touching probe.

FIG. 9 illustrates a cross sectional view of a different embodiment according to the present invention comprising a conductive material for as a touching probe.

FIG. 10 shows a cross sectional view of another embodiment according to the present invention comprising a window for using the file clip as a touching probe.

FIG. 14A is a perspective view of yet another embodiment according to the present invention comprising a plurality of notches and a handle for clamping different sizes of endodontic files.

FIG. 14B is a side view of the embodiment shown in FIG. 14A.

FIG. 14C is a front view of the embodiment shown in FIG. 14A.

FIG. 14D is a rear view of the embodiment shown in FIG. 14A.

Figure 1A:
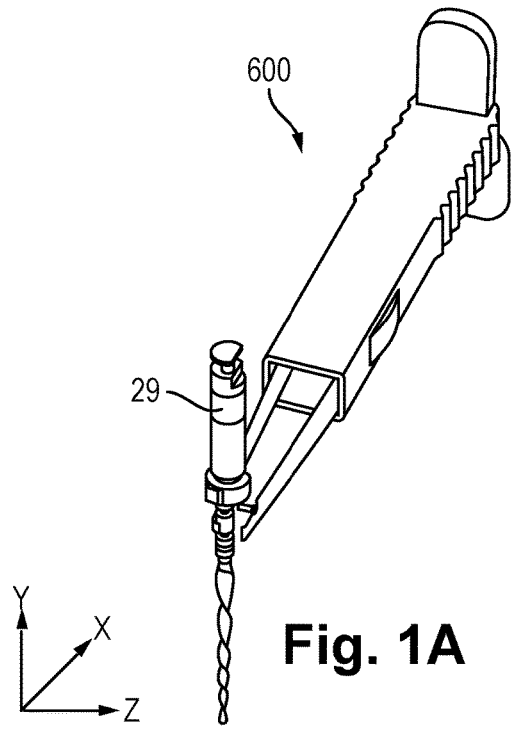
FIG. 1A illustrates a perspective view of an embodiment with a tweezer-like profile according to the present invention.

Different ones of the Figures may have at least some reference numerals that are the same in order to identify the same components, although a detailed description of each such component may not be provided below with respect to each Figure.

DETAILED DESCRIPTION OF THE INVENTION

In accordance with example aspects described herein a device may be provided for locating an apical foramen in order to measure a length of a root canal (not shown) wherein the device is configured to maximize efficiency and ease of use of the attachment for endodontic procedures with endodontic files or hand instrument. The device may be a file clip, a touching probe or the like.

As defined herein, tweezer and/or tweezer-like refers to a structural configuration where opposing flanks/fingers are movable away and/or towards each other through a biasing (spring-type) movement. In one specific example, a tweezer-like structure will have a closed position where the flanks/fingers are releasably securing a tool to the tweezer-like structure and an open position where the tool may be removed and is no longer secured to the tweezer-like structure. Moving from the open and closed positions may occur through force applied by the user and/or biasing force (spring force) of the tweezer-like structure.

Figure 1B:
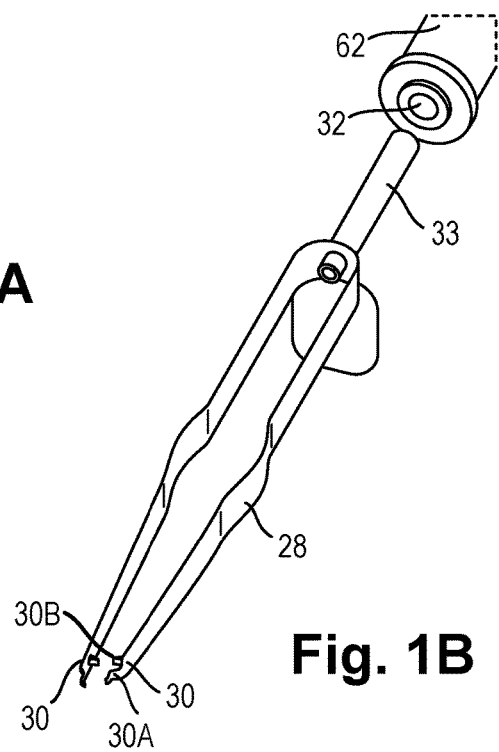
FIG. 1B illustrates an exploded view of a part of FIG. 1A.
Figure 1C:
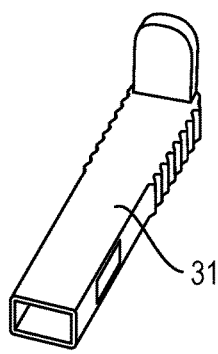
FIG. 1C shows a perspective view of a plastic part of the embodiment shown in FIG. 1A.

FIGS. 1A, 1B and 1C illustrate an embodiment of the apex locator attachment. The attachment/file clip 600 may include a element 28 having a tweezer-like profile. The element 28 may be formed various material such as a plastic material, a metal material or a composite. In one specific embodiment the element 28 is formed of a metal material, which may be made of electrically conductive material. A hand instrument 51 or endodontic file 29 may be clamped with the gripper jaws 30 of the metal element. The metal element 28 may be covered with a coating component 31 such as plastic or otherwise insulating material. The component 31 may be removably attached/secured to (e.g., constructed to be disassembled from) the metal element 28 prior to reprocessing. The gripper jaws 30 of the tweezer element 28 can be opened or closed by the sliding the plastic part 31 along the length of the element 28. Each gripper jaw 30 may include a bent end portion 30A and one or more protrusions 30B to reduce or substantially prevent the tool 29, 51 from movement therebetween. A connection to a female plug 32 of a measurement cable 62 may be realized by a jack style connector 33. The file clip 600 may be dimensioned to have a have a length in the x axis direction ranging from about 30 mm to about 65 mm, and preferably from about 40 mm to about 55 mm (e.g., 47 mm).

Figure 2A:
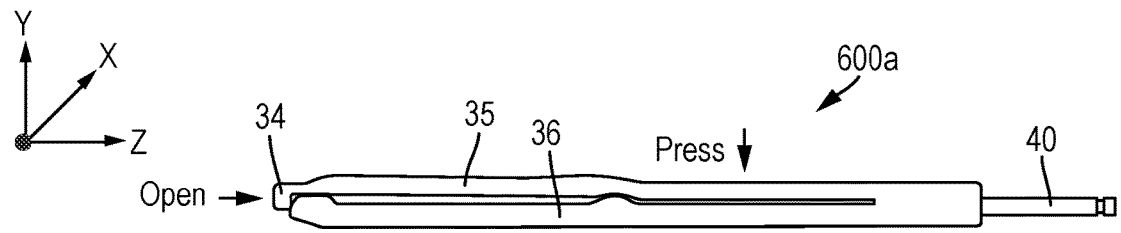
FIG. 2A shows a side view of another embodiment with a tweezer-like profile and a first shape of gripper jaws according to the present invention.
Figure 2B:
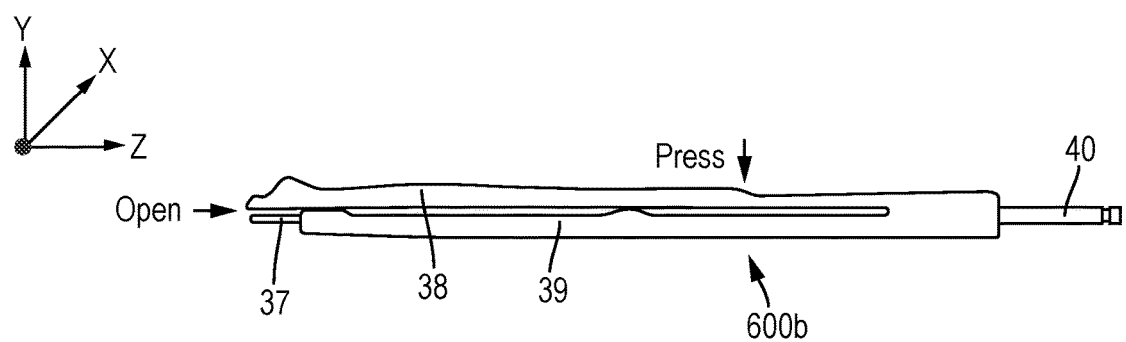
FIG. 2B shows a side view of another embodiment with a tweezer-like profile and a second shape of gripper jaws according to the present invention.

In other embodiments of the present invention as shown in FIGS. 2A and 2B, the file clip 600a and 600b may have a tweezer-like outer profile. As shown in FIG. 2A-2B, file clips 600a and 600b may include two flanks 35, 36 (FIG. 2A) and 38, 39 (FIG. 2B), which may be made of plastic. Flanks 36 and 39 may contain an electrode 40, which may be made of electrically conductive material and may be plugged into a female connector 32 of a measurement cable 62. The two embodiments may differ in the shape of the gripper jaws (34, 37) as well as the length of the over-molded part of the lower flank (36, 39). Gripper jaw 37 may include a metal overhang at the tip 37 for use as a touching probe. Herein, the metal overhang may be used to temporarily to touch an endodontic probe 29 for root canal length measurement. In an exemplary embodiment, a length of the file clip 600a in the Z-axis direction may be 55 mm-75 mm (e.g., 67.0 mm). In another an exemplary embodiment herein, a length of the file clip 600b in the Z-axis direction may be 70.0 mm. An endodontic file 29 or hand instrument 51 may fit into the gripper jaw 37, 34 which may include an exposed part of the electrode 40 for root canal measurement.

Figure 3:
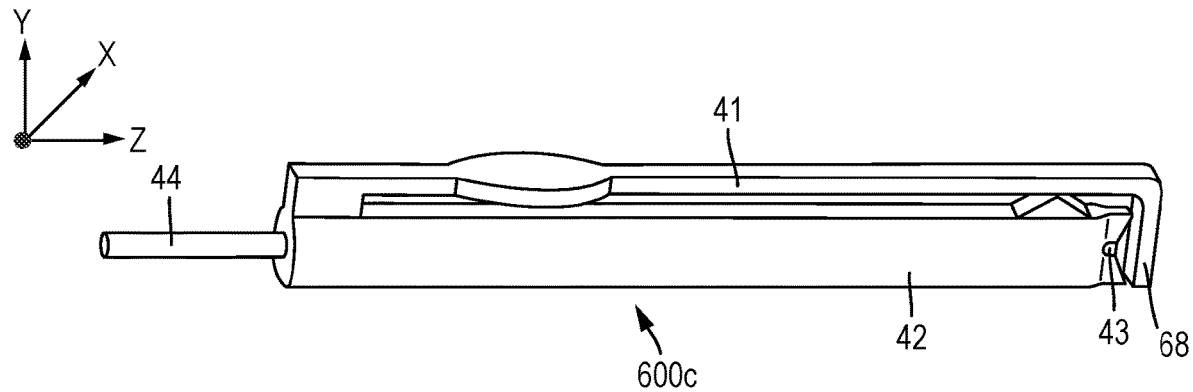
FIG. 3 shows a perspective view of another embodiment with a tweezer-like profile according to an embodiment herein.

FIG. 3 shows yet another embodiment of the present invention having a tweezer-like outer profile wherein file clip 600c includes two flanks 41 and 42, and wherein the flanks may be made of plastic. Flank 42 as shown in FIG. 3 may contain an electrode, which ends at a tip 43 of the file clip. The other end may be constructed as a jack style connector 44, which may be plugged into a female plug 32 of a measurement cable 62. The measurement cable 62 may be connected to an electronic apex locator for measurement of the depth of the apical foramen of a patient. An endodontic file 29 or hand instrument 51 may fit into the gripper jaw 68 which may include an exposed part of the electrode 40 at the tip 43 for root canal measurement.

Figure 4A:
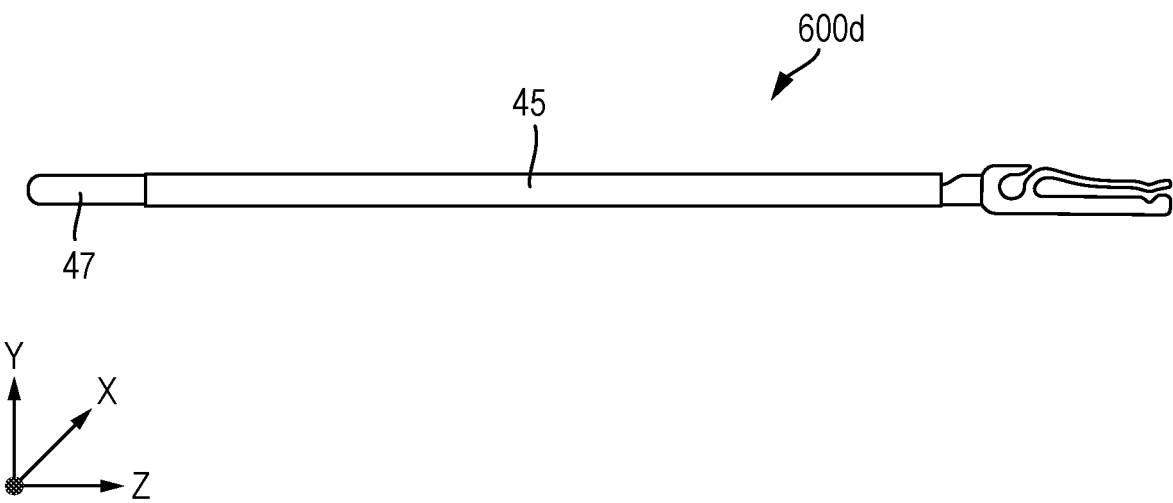
FIG. 4A is a side view of another embodiment of the present invention comprising a plurality of openings to accept an endodontic file.
Figure 4B:
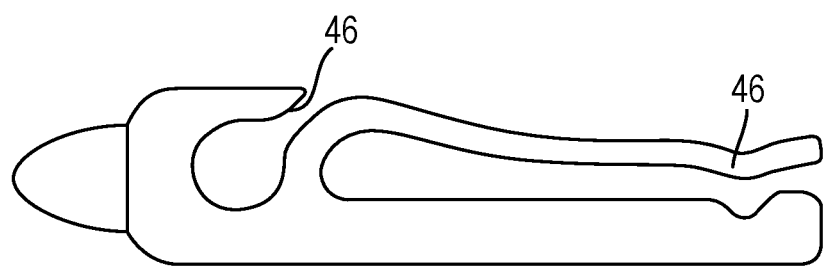
FIG. 4B is a side view of an enlargement of a portion of the embodiment shown in FIG. 4A.

FIG. 4A illustrates another exemplary embodiment herein comprising a metal electrode 47 and a plurality of openings 46 for receiving an endodontic file during dental endodontic treatment. As shown in FIGS. 4A and 4B file clip 600d includes of a metal electrode 47 that may be partly over-molded with plastic 45. An end of the metal electrode may be constructed as a jack style connector for connection to a female connector 32 of a measurement cable 62. The file clip 600d may further include a plurality of openings 46, for clamping different shaft diameters of and endodontic file/dental hand instrument during root canal measurement. In an embodiment herein, the number of openings may be two or more. Additionally, the plurality of openings 46 may be made of metal and thus may be used as a touching probe.

Figure 5:
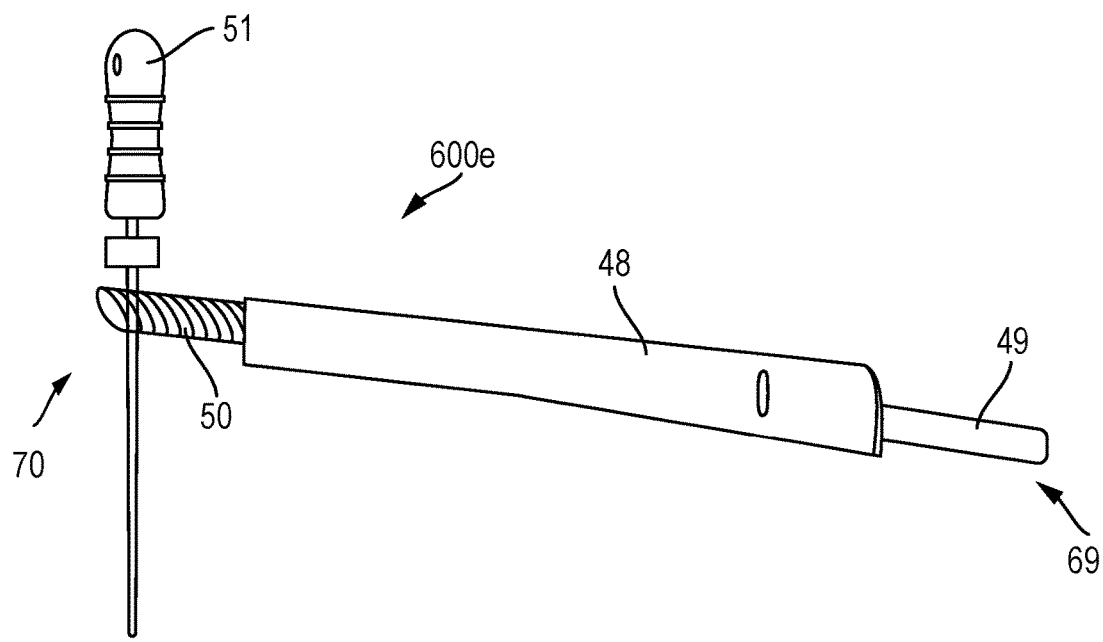
FIG. 5 illustrates a side view of another embodiment according to the present invention comprising a spring for contacting an endodontic file.

FIG. 5, illustrates another embodiment of the present invention, which provides a file clip 600e having a biasing member (spring) 50 for engaging (releasably securing) a hand instrument 51 or endodontic file 29. An electrode 49 may be over-molded by a coating layer 48 such as plastic or otherwise insulating material. The hand instrument 51 or endodontic file 29 may be clamped with the spring 50 which may be located at a tip of the plastic part 48. The electrode 49 may be constructed to be or to receive a jack style connector at a cable connection end 69 and to be electrically connected to the spring 50 at the other end 70. The jack style connector at the cable connection end 69 may be plugged into a female connector 32 of a measurement cable 62 for root canal measurement.

Figure 6:
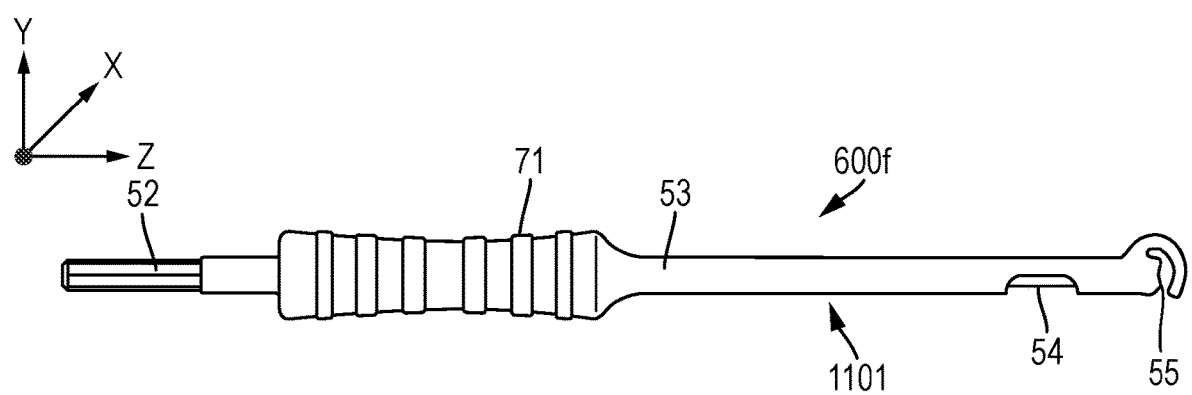
FIG. 6 shows a side view of another embodiment according to the present invention according to the present invention.

FIG. 6 illustrates yet another embodiment of the present invention, which provides a file clip 600f constructed with a hook 55 for engaging an endodontic file 29 or hand instrument 51. The file clip 600f includes an electrode 52 that forms the conductive connection to an apex locator. This electrode may also be over-molded with a coating 53 such as a plastic material or other insulating material during an injection molding process. The file clip 600f may be constructed to have a total length in the Z-axis ranging from about 45 mm to about 80 mm and preferably from about 55 mm to about 70 mm (e.g., 60 mm). A length of the coating component/handle 53 in the Z-axis may range from about 35 mm to about 70 mm and preferably from about 40 to about 60 mm (e.g., 50 mm). At the location of the handle 71, the electrode may have a diameter ranging from about 0.5 mm to about 5 mm, and preferably from about 1 mm to about 3.5 mm (e.g., 2.0 mm). At the front section 1101, the electrode may be designed to have a smaller diameter of 0.5 mm to less than 2.0 mm. The file clip 600f may further include a window 54 to enable root canal measurement by touching a hand instrument 51 or an endodontic file 29 with an exposed part of the electrode 52 through the window 54. In an exemplary embodiment herein. The file clip 600f may be constructed to be used with endodontic files 29 with shaft diameters between 0.5 and 1 mm (e.g., 0.6 mm and 0.8 mm) wherein the endodontic file 29 may be held in the hook 55 for contacting an exposed part of the electrode 52 in the hook during root canal measurement.

Further embodiments of the present invention are illustrated in FIGS. 7-10. Herein, tips of the file clips for engaging (releasably securing) an endodontic file 29 or hand instrument 51 are discussed. The file clips may work according to similar principles described above wherein upon coming into contact with an endodontic file (metal portion of endodontic file), electrodes 56 relay information through a cable to an apex locator for measurement of the length of a root canal. The file clips 600g, 600h, 600i, and 600j include an electrode 56, made of electrically conductive material, which may be over-molded with a coating material such as plastic or otherwise insulating material. The file clip tip may include one or more flanks/fingers being at least partially or substantially covered with the coated/plastic portion. As shown in FIGS. 7 and 10, the file clip tip may include a first finger 58A that is substantially covered with the coating material and a second finger 58B that is partially covered with the coating material thereby exposing at least a portion of the electrode 56 on at least one side of the second finger 58B. Optionally, as shown in FIGS. 8 and 9, the electrode 56 along the second finger 58B may be substantially exposed (e.g., without having a coating). In order to provide a clamping of various sizes of hand instruments, the plastic portion of the first finger 58A may include a plurality of notches 63 for receiving and restricting the movement of different sizes of endodontic files 29 or hand instruments 51 during root canal measurements. File clips 600g and 600j (FIGS. 7 and 10) may have a window 57 for use as a touching probe by temporarily engaging an exposed portion of the electrode 56 with an endodontic file 29 in use. In other embodiments, as shown in FIGS. 8 and 9, a window may be not required since the conductive material (e.g., metal) overhang 1301 and 1401 may be used as touching probes.

Figure 11:
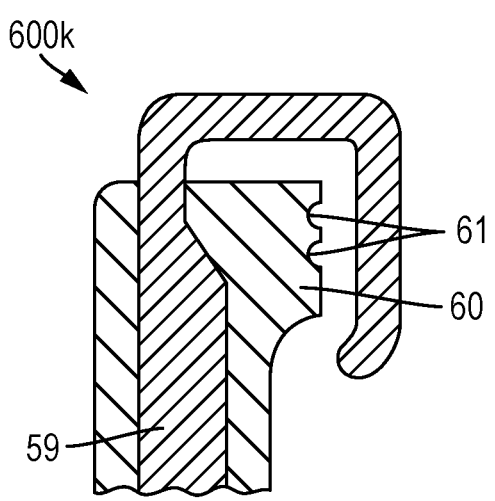
FIG. 11 is a cross sectional view of an embodiment according to the present invention comprising a plurality of notches for clamping different sizes of endodontic files.
Figure 12:
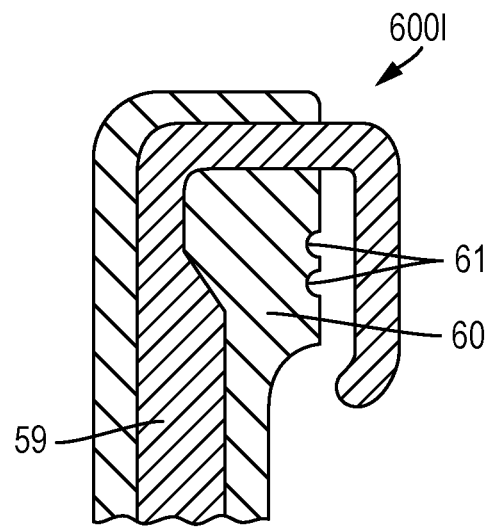
FIG. 12 is a cross sectional view of an embodiment according to the present invention comprising another plurality of notches for clamping different sizes of endodontic files.
Figure 13:
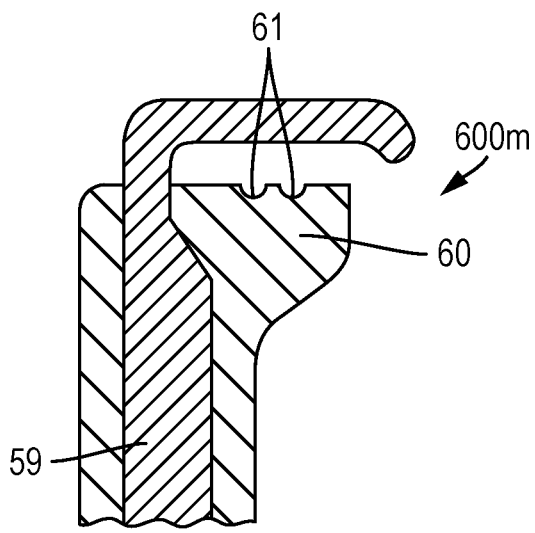
FIG. 13 is yet another a cross sectional view of another embodiment according to the present invention comprising another plurality of notches for clamping different sizes of endodontic files.

FIGS. 11-13 illustrate further embodiments of the present invention, which include file clips 600k. 600l, and 600m having a bent electrode 59. The electrode 59 may be over-molded with a coating material 60 such as plastic or otherwise insulating material. The coating material 60 may include one or more notches 61 for receiving a portion of the hand instrument or file, which may enable the dentist to clamp different sizes of hand instruments to the file clip. Herein, the electrode 59 may also be used as a touching probe.

In a further embodiment as illustrated in FIGS. 14A to 14D, a file clip 600n comprises a plurality of notches 61 for holding an endodontic file 29 or hand instrument 51. In addition, a reinforced handled 64 may be provided for firm grasping with one hand and/or to prevent the internal electrode from breaking. In an exemplary embodiment herein, the file clip 600n may include a bendable part (e.g., one or more biasing members), which may be partly or fully made of a memory alloy (NiTI or the like) that automatically straightens back to a predetermined shape after being heated above a predetermined temperature, for example above 250° F. during, reprocessing. This may also be realized for other embodiments of the file clip 600. In another exemplary embodiment, the file clip 600n may have an electrode 67 that extends at an end of the file clip 600n and extends along/through the file clip) to a cantilevered projection 65 having notches 61 and/or a substantially rectangular profile. The cantilevered projection 65 may be constructed to spring back to hold a hand instrument 51 or endodontic file 29 between itself and a non-moving plastic arm 66 of the file clip 600n when an outward force is applied to the cantilevered projection 65 by the a hand instrument 51 or endodontic file 29.

Similarly a file coating material of embodiments discussed herein may be a material that can withstand stress and is capable of being autoclaved. The electrode 67 may be made of Nickel-Titanium (NiTi) material such that it is capable of bending. In an embodiment herein, the coating material may be injection molded from Polyetherimide products such as Ultem resins. Moreover, the structure of the file clip may be such that there are no moving parts, thus eliminating crevices and holes where microorganisms can hide to reduce cleaning efficiency. It will be apparent to persons skilled in the art that various changes in form and detail can be made therein (e.g., different file clip shapes, apex locator to file clip communications interface, and the like) without departing from the spirit and scope of the present disclosure.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The disclosure may be embodied in other specific forms without departing from the spirit or essential attributes thereof, and it is therefore desired that the present embodiments be considered in all respects as illustrative and not restrictive. Any headings utilized within the description are for convenience only and have no legal or limiting effect.

The invention claimed is:

1. An apex locator attachment for electrically coupling different dental instruments to an apex locator comprising:
   an electrode comprising an electrically conductive material that includes a first portion and a second portion; and
   an insulating overmold which at least partly covers the electrode;
   wherein the first portion includes a clamping element with a spring back mechanism that clamps or hooks the apex locator attachment to the different dental instruments for root canal measurement,
   wherein the second portion is constructed as a jack-style connector or constructed to receive a jack-style connector for connection to an electrical connector of the apex locator,
   wherein the apex locator attachment is configured to determine a position of an apical foramen to measure a length of a root canal during endodontic treatment, and
   wherein:
   (i) the first portion of the electrode includes a plurality of openings for clamping different shaft diameters of the dental instruments, or (ii) a plastic portion of a finger exposes at least a portion of the electrode and includes a plurality of notches for receiving and clamping different sizes of the dental instruments, or (iii) a cantilevered projection extends to the electrode and includes a plurality of notches, the cantilevered projection constructed to spring back to hold the different dental instruments.

2. The apex locator attachment of claim 1, wherein the insulating overmold is made of Polyetherimide.

3. The apex locator attachment of claim 1, wherein the plastic portion of the finger exposes at least the portion of the electrode, wherein the apex locator further comprises a window in the insulating overmold wherein the window exposes a portion of the electrode for electrically coupling the different dental instruments to the apex locator at a location of the exposed electrode.

4. The apex locator attachment of claim 1, wherein a whole or part of the apex locator attachment is constructed to be bendable.

5. The apex locator attachment of claim 4, wherein the electrode comprises a memory alloy to allow the attachment to automatically straighten to a predetermined shape after heating above a predetermined temperature.

6. The apex locator attachment of claim 5, wherein the electrode comprises NiTi material.

\* \* \* \* \*